Figure 2:
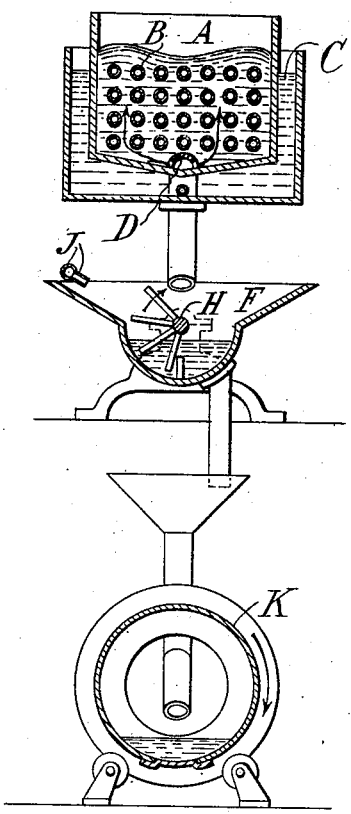

No. 755,843. PATENTED MAR. 29, 1904.
J. H. CAMPBELL.
MILK PRODUCT RESEMBLING BUTTER AND PROCESS OF MAKING SAME.
APPLICATION FILED JAN. 6, 1903.
NO MODEL.

WITNESSES:
Fred White
Thomas H Wallace

INVENTOR:
Joseph H. Campbell,
By Attorneys,
Arthur E. Fraser & Co.

No. 755,843. Patented March 29, 1904.

UNITED STATES PATENT OFFICE.

JOSEPH H. CAMPBELL, OF NEW YORK, N. Y.

MILK PRODUCT RESEMBLING BUTTER AND PROCESS OF MAKING SAME.

SPECIFICATION forming part of Letters Patent No. 755,843, dated March 29, 1904.

Application filed January 6, 1903. Serial No. 138,016. (No specimens.)

*To all whom it may concern:*

Be it known that I, JOSEPH H. CAMPBELL, a citizen of the United States, residing in the borough of Brooklyn, county of Kings, city and State of New York, have invented certain new and useful Improvements in Milk Products Resembling Butter and Processes of Making the Same, of which the following is a specification.

My invention aims to provide a new food product resembling butter and having about the consistency of butter and made largely or wholly from milk, including the non-fatty as well as the fatty solids of milk and a process of making the same. The product of my invention contains milk-fat and also non-fatty milk solids in excess of the proportion found in cream and generally in ordinary butter and water of milk, the whole being concentrated to a substantial solid at ordinary temperatures and of about the consistency of ordinary butter. Preferably the fatty solids are retained in the unsterilized form in the product, so that their flavor shall be well developed. In the preferred process the temperatures used are such that the unsterilized cultures or bacteria in the cream rapidly multiply so as to thoroughly inoculate the mass with the desired flavor. Preferably the same relative quantities of fatty and non-fatty solids are found in the product as in normal milk, the percentage of water only being reduced. The degree of reduction may be varied just as in ordinary butter the quantity of water is found to vary considerably. I prefer to carry the reduction or concentration to such a point that one hundred pounds of whole milk will produce from fourteen or fifteen to twenty pounds of the final product, depending upon the richness of the milk and that of the desired product. In one hundred pounds of milk there are approximately 3.5 pounds of fat and 9.6 pounds of non-fatty solids. If the one hundred pounds of milk be reduced to fifteen pounds, then the fats are twenty-three per cent. and the non-fatty solids sixty-four per cent. of the product, the water being only thirteen per cent. If the one hundred pounds of milk be reduced to twenty pounds, then the fats compose seventeen per cent. and the non-fatty solids forty-eight per cent. of the product, the water composing thirty-five per cent. The product should also contain salt and yellow coloring, such as is commonly used with ordinary butter. The product may also be modified without departure from my invention by the partial or complete substitution for milk-fat of "oleo-oil" or other ingredients suitable for use in butter substitutes, these substitutes being introduced, for example, in the same manner as milk-fat in the specific process hereinafter described. The product may be grained and worked to give it the same physical structure as ordinary butter.

My improved product is superior to ordinary butter in containing the solids which are ordinarily lost in buttermilk, curd, or whey, which are especially rich in milk-sugar and in proteids. In my product is retained also a considerable quantity of fat ordinarily lost in curd and to a less extent in buttermilk and whey. It is much cheaper than ordinary butter, because of the utilization in a single product of all the solids of the milk and because also the product may be obtained with a very small quantity of water without the expensive manipulation necessary to eliminate the water from ordinary butter. By reason of the small quantity of water in the best quality of my product it keeps fresh longer than ordinary butter.

According to the preferred process of making my improved product, milk is separated and the skim-milk partly concentrated, after which the cream is mixed into the mass and the mixture concentrated to the desired consistency. The first concentration should be continued to such a point that the second concentration may be carried out with sufficient rapidity and yet at such a low temperature as to avoid sterilizing the added cream. With the treatment which I have used I find that the concentration of the skim-milk may be continued until it is brought to about the consistency of ordinary condensed milk. If a quicker or slower method of treatment is to be used in the concentration of the mixture, the cream may be added while the skim-milk is thinner or thicker than ordinary condensed milk. Preferably the quantity of cream added is approximately that which was originally in the whole milk. The second concentrating operation may, as stated above, be continued a longer or shorter time, depending on the percentage of water to be retained in the final product, the weight of the product varying between the approximate limits of fifteen and twenty per cent. of that of the original milk. After concentration the product lacks the granular structure characteristic of butter. The process may therefore be extended to include granulation. For example, the product may be discharged directly from the second concentrating vessel into a tank containing ice-water, which will have the desired granulating effect. The mass may then be subsequently treated to drain off the water and may be churned, reworked, salted, and colored with saffron or other suitable coloring-matter, as is butter made in the ordinary way.

A specific embodiment of the process of my invention which I have used will be described with reference to the accompanying drawings, though it is to be understood that the process is quite independent of any specific style of apparatus.

Figure 1:
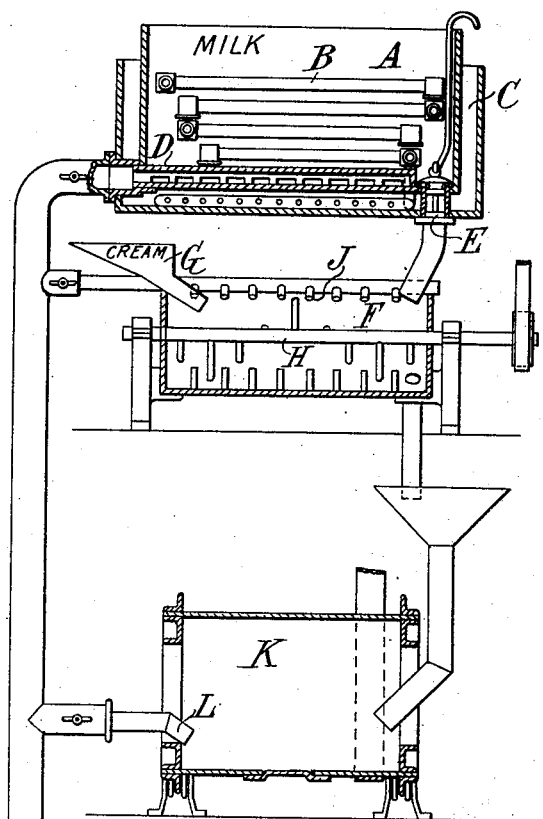
Figure 3:
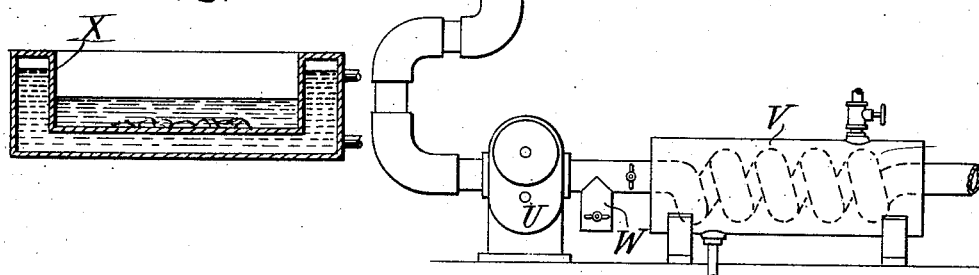

Figure 1 is a longitudinal and Fig. 2 a transverse section through the several elements of the principal apparatus. Fig. 3 is a section of a graining-tank.

The milk is separated by any desired method and the skim-milk put into a concentrating-tank A, where it is maintained at a desired evaporating temperature below the coagulating-point of albumen by means of hot water circulated through coils B and a jacket C, so as to partially vaporize it, exposing it at the same time to a blast of air through the perforated pipe D, the volume of air supplied depending upon the applied temperature and the desired temperature of the milk. The blast of air carries off the heated vapor produced by the applied heat and maintains the milk at a temperature below that of the applied heat. This difference in temperature in turn hastens the process, the external heat being continually taken up by the milk and carried off with a portion of the vapor by the blast of air. After concentrating the milk to the desired degree in the tank A the valve E is opened to let the milk into a mixer or combined mixer and concentrator F, into which also the cream is conducted from a hopper G. The mixture should be allowed to stand here until cooled to below 120° Fahrenheit, and preferably to about 100° Fahrenheit. The shaft H is rotated and its arms stir and mix the product, being assisted in this function by the pins projecting inward from the lower wall of the vessel. The time spent in mixing the product in the mixer F may also be utilized in concentrating the same by providing a series of nozzles J at one side of the vessel through which air is projected into the mass and upon the extended surfaces exposed by the rotating arms on the shaft H, the mode of operation being in effect identical with that carried on in the next vessel. The vessel F and the operations carried on therein may, however, be omitted entirely, a sufficient mixing of the mass occurring in the hereinafter-described concentrator and simultaneously with the concentration of the mass therein. When the mixer F has been used, however, the product is led therefrom into a drum K, into which heated air is projected through a nozzle L, the drum being slowly rotated, as by the belt shown in Fig. 1, so as to expose an extended surface of the product to the concentrating action of the air. The operation in this drum is continued until the mass has been reduced to fifteen or twenty per cent. of the weight of whole milk used. It may then be discharged directly into an ice-water tank for granulating, such as the tank X, having a jacket for brine or other cooling medium, and subsequently treated in the well-known manner employed in making ordinary butter.

U is a pressure-blower for supplying air to the several vessels, a heater being shown at V for heating the air and a branch pipe W for obtaining a supply of unheated air.

I may, if desired, use sterilized air in carrying out the first stage of my process. In such case the milk during the first stage of the process may be, and preferably is, rendered entirely sterile, and when the cream has been added the mixture will contain only the bacteria of the cream, these being the bacteria which are desirable in order to obtain a good flavor in the product. The flavor may be intensified by the addition of the particular bacteria producing the flavor. Especially where other fats than pure cream are used the addition of the bacteria is useful. Such bacteria are now well-known manufactured products and a good butter culture is easily obtained.

The milk used in the first stage of the process is not necessarily perfectly separated. It may contain a certain amount of cream considerably above that contained in ordinary skim-milk, also the process of concentration described for the first stage may be substituted by any of the known processes of concentrating or condensing milk—such, for example, as the well-known vacuum process.

Though I have described with great particularity of detail a process embodying my invention and a particular product of such process, yet I am not to be understood as limiting my invention to the specific product and process described. The specific process and temperatures described have the advantage of concentrating the milk so rapidly as to avoid souring and at such a low temperature as to preserve the soluble and peptogenic qualities of the proteids of the milk; but variations of the same are possible to those skilled in the art without departure from the broad invention. For example, the product might be obtained synthetically, as by adding together and thoroughly mixing the fats and non-fatty solids and the desired quantity of water. It is understood also that many variations may be made in the proportion of the ingredients or by the addition or substitution of ingredients known to those skilled in the art without departure from the product of the invention and that the process is equally intended for such modified compositions. For example, a richer product may be obtained by using cream richer in butter-fat or by using a greater quantity of cream than that specified, and in this way the process may also be shortened by reason of the lower percentage of water to be eliminated.

What I claim is—

1. A milk product resembling butter and substantially solid at ordinary temperatures and of about the consistency of butter and containing only fat, uncoagulated non-fatty milk solids in excess of the proportion found in cream, and water.

2. A milk product resembling butter and substantially solid at ordinary temperatures and of about the consistency of butter and containing only fat, uncoagulated non-fatty milk solids in excess of the proportion found in cream, and water, the whole being grained so as to have the same physical structure as butter.

3. A milk product resembling butter and substantially solid at ordinary temperatures and of about the consistency of butter, containing water, and approximately the same relative quantities of fat and non-fatty milk solids as in normal milk.

4. A milk product resembling butter substantially solid at ordinary temperatures and containing milk-fat approximately from seventeen to twenty-three per cent.; non-fatty milk solids approximately from forty-eight to sixty-four per cent.; and sufficient water to give it about the consistency of butter.

5. A milk product resembling butter and substantially solid at ordinary temperatures and of about the consistency of butter, containing unsterilized milk-fat, sterilized non-fatty milk solids, and water.

6. The process of making a food product, which consists in partially concentrating skim-milk by applying heat thereto so as to partially vaporize the same and exposing it at the same time to a blast of air in such volume as to carry off the heated vapor produced, and maintain the milk at a sterilizing temperature below the coagulating-point of albumen whereby the milk is concentrated so rapidly as to avoid souring and at such a low temperature as to preserve the soluble and peptogenic qualities of the proteids, mixing with the partially-concentrated skim-milk approximately the quantity of cream which was originally in the milk, and concentrating the mixture at a non-sterilizing temperature to about the consistency of butter whereby the mass is well inoculated with the flavor of the cream.

7. The process of making a food product, which consists in partially concentrating skim-milk by applying heat thereto so as to partially vaporize the same, and exposing it at the same time to a blast of air in such volume as to carry off the heated vapor produced and to maintain the milk at a temperature below that of the applied heat, whereby the milk may be concentrated rapidly and at a low temperature, mixing with the partially-concentrated skim-milk approximately the quantity of cream which was originally in the milk, and concentrating the mixture to about the consistency of butter.

8. The process of making a food product, which consists in partially concentrating skim-milk by applying heat thereto so as to partially vaporize the same, and exposing it at the same time to a blast of air in such volume as to carry off the heated vapor produced and to maintain the milk at a temperature below that of the applied heat, whereby the milk may be concentrated rapidly and at a low temperature, mixing with the partially-concentrated skim-milk approximately the quantity of cream which was originally in the milk, and concentrating the mixture at a non-sterilizing temperature to about the consistency of butter, whereby the mass is well inoculated with the flavor of the cream.

9. The process of making a milk product solid at ordinary temperatures and resembling butter which consists in partially concentrating skim-milk, adding cream, and concentrating the mixture to about the consistency of butter.

10. The process of making a milk product solid at ordinary temperatures and resembling butter which consists in partially concentrating skim-milk, adding approximately the quantity of cream originally in the milk, and concentrating the mixture to about the consistency of butter.

11. The process of making a milk product solid at ordinary temperatures and resembling butter which consists in partially concentrating skim-milk, adding approximately the quantity of cream originally in the milk, and concentrating the mixture to approximately from fifteen to twenty per cent. of the original volume of whole milk.

12. The process of making a milk product solid at ordinary temperatures and resembling butter which consists in partially concentrating skim-milk, adding cream, concentrating the mixture to about the consistency of butter, and graining the mass.

In witness whereof I have hereunto signed my name in the presence of two subscribing witnesses.

JOSEPH H. CAMPBELL.

Witnesses:
FRED WHITE,
DOMINGO A. USINA.